(12) United States Patent
Zhu et al.

(10) Patent No.: US 11,731,104 B2
(45) Date of Patent: Aug. 22, 2023

(54) PREPARATION METHOD FOR BIOMASS-BASED HYPERBRANCHED ADSORPTION MATERIAL

(71) Applicant: GUANGXI UNIVERSITY, Guangxi (CN)

(72) Inventors: Hongxiang Zhu, Guangxi (CN); Hui He, Guangxi (CN); Lei Wang, Guangxi (CN); Fei Xue, Guangxi (CN); Xianlin Lei, Guangxi (CN)

(73) Assignee: GUANGXI UNIVERSITY, Guangxi (CN)

( * ) Notice: Subject to any disclaimer, the term of this patent is extended or adjusted under 35 U.S.C. 154(b) by 167 days.

(21) Appl. No.: 17/401,299

(22) Filed: Aug. 12, 2021

(65) Prior Publication Data

US 2022/0395808 A1 Dec. 15, 2022

(30) Foreign Application Priority Data

Jun. 10, 2021 (CN) .......................... 202110649368.0

(51) Int. Cl.
*B01J 20/24* (2006.01)
*B01J 20/30* (2006.01)

(52) U.S. Cl.
CPC ............ *B01J 20/24* (2013.01); *B01J 20/3078* (2013.01); *B01J 2220/445* (2013.01); *B01J 2220/485* (2013.01); *B01J 2220/4831* (2013.01)

(58) Field of Classification Search
CPC .. B01J 20/24; B01J 20/3078; B01J 2220/445; B01J 2220/4831; B01J 2220/485
USPC ....................................................... 502/404
See application file for complete search history.

(56) References Cited

U.S. PATENT DOCUMENTS

2020/0047154 A1* 2/2020 Gang ...................... C02F 1/28

* cited by examiner

*Primary Examiner* — Edward M Johnson
(74) *Attorney, Agent, or Firm* — JCIP Global Inc.

(57) ABSTRACT

The invention provides a biomass-based hyperbranched adsorption material with multi-adsorption sites to multiple heavy metal ions and a preparation method thereof. The biomass-based hyperbranched adsorption material with multi-adsorption sites to multiple heavy metal ions is prepared by one-step instant-crosslinking method using a biomass raw material as matrix and a hyperbranched polymer containing chelating atoms of N, O, and S as functional reagent, wherein the hyperbranched polymer has two or more different adsorption sites (containing elements such as N, S, O, etc.) to heavy metal ions.

7 Claims, No Drawings

PREPARATION METHOD FOR BIOMASS-BASED HYPERBRANCHED ADSORPTION MATERIAL

CROSS-REFERENCE TO RELATED APPLICATION

The present application is based on and claims the priority benefits of China application No. 202110649368.0, filed on Jun. 10, 2021. The entirety of the above-mentioned patent application is hereby incorporated by reference herein and made a part of this specification.

BACKGROUND

Technical Field

The present invention belongs to the field of fiber modification, and specifically relates to a biomass-based hyperbranched adsorption material with multi-adsorption sites to multiple heavy metal ions and a preparation method and use thereof.

Description of Related Art

With the rapid development of modern industry, a large number of mining, metallurgy, electroplating, leather and other industries are established, which will inevitably cause a large number of heavy metals to flow into human daily life through industrial wastewater or industrial waste residue, which will cause irreversible damage to human body. Therefore, many heavy metal ion treatment methods have been developed by researchers. The common methods of heavy metal ion treatment are chemical precipitation, electrochemical method, ion exchange method and adsorption method. Adsorption method is simple to operate and easy to deal with wastewater containing heavy metal ions on a large scale, and thus it is widely concerned. The common adsorbent types include carbon, synthetic polymer, MOFs, minerals and natural macromolecules. The synthetic polymer adsorbents have attracted more and more attention because of its large amount of functional groups, large adsorption capacity and high removal rate. However, the synthetic polymer adsorbents usually are hard solid, and there are also a lot of functional groups in the material. Because it cannot effectively contact with the target heavy metal ions in the solution, the utilization rate of functional groups of the materials is low. At the same time, it is difficult to degrade the synthetic polymer adsorbents in nature, which is easy to cause serious secondary pollution. Therefore, the biomass is chosen as the base material to modify the surface of the material. The prepared biomass adsorption material has the characteristics of high surface functional group density and large specific surface, which effectively promotes the effective contact between the adsorption functional group and the target heavy metal ions. At the same time, the biomass-based heavy metal ion adsorption material has the characteristics of biodegradability, which is not easy to cause secondary pollution to the environment. Traditional functional groups grafted on biomass surface generally have only one or one type of functional groups. Although they can effectively adsorb heavy metal ions in water, they can only deal with one or the heavy metal ions with the same charge properties, which is difficult to treat the heavy metal ions of various properties in water at the same time. Also because most heavy metal ions fixed on the surface of adsorbent react with the functional groups on the adsorbent in the form of chemical bonds to produce chemical bonds, a large amount of energy is needed in the desorption process. Therefore, it is very important to design a biodegradable biomass-based adsorption material which can adsorb a variety of heavy metal ions in water at the same time and can realize the desorption and reuse of heavy metal ions under low energy consumption.

SUMMARY

In view of the defects of the biomass-based heavy metal adsorption material of the prior art, the present invention provides a biomass-based hyperbranched adsorption material with multi-adsorption sites to multiple heavy metal ions and a preparation method thereof. The material has excellent adsorption performance to multiple heavy metal ions in the water body which can simultaneously, rapidly and completely remove multiple heavy metal ions ($Cr^{6+}$, $Cu^{2+}$, $Pb^{2+}$) of low concentration within 10 minutes, and no heavy metal ions remain in the water body treated. Renewability of the material is stable.

An objective of the present invention is to provide a biomass-based hyperbranched adsorption material with multi-adsorption sites to multiple heavy metal ions.

Another objective of the present invention is to provide a preparation method for the above-mentioned biomass-based hyperbranched adsorption material with multi-adsorption sites to multiple heavy metal ions.

Another objective of the present invention is to provide use of the above-mentioned biomass-based hyperbranched adsorption material with multi-adsorption sites to multiple heavy metal ions.

The above objectives of the present invention are achieved by the following technical solutions.

A biomass-based hyperbranched adsorption material with multi-adsorption sites to multiple heavy metal ions is prepared by one-step instant-crosslinking method using a biomass raw material as matrix and a hyperbranched polymer containing chelating atoms of N, O, and S as functional reagent.

The hyperbranched polymer containing chelating atoms of N, O, and S is synthesized by an amidation reaction of hyperbranched polyamine, hyperbranched polycarboxylic acid and hyperbranched polythiourea; in the hyperbranched polymer containing chelating atoms of N, O, and S, the N-containing group is selected from a group consisting of primary amino group, secondary amino group and tertiary amino group, the O-containing group is carboxyl group, and the S-containing group is selected from a group consisting of C—S and C=S.

Preferably, the biomass raw material is selected from a group consisting of microcrystalline cellulose, nano cellulose, pulp fiber, bagasse, straw, peanut hull and corn cob.

A preparation method for the biomass-based hyperbranched adsorption material with multi-adsorption sites to multiple heavy metal ions, includes the following steps:

step 1, preparing a hyperbranched polymer containing chelating atoms of N, O, and S through an amidation reaction of hyperbranched polyamine, hyperbranched polycarboxylic acid and hyperbranched polythiourea, wherein in the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S; the specific reaction is as follows: the carboxyl group of the hyperbranched polycarboxylic acid reacts with the primary amino groups of the hyperbranched polyamine and of the hyperbranched polythiourea to generate the hyperbranched polymer containing chelating atoms of N, O, and S in which the hyperbranched polycarboxylic acid is connected with the hyperbranched polyamine and the hyperbranched polythiourea by chemical bonds, a molar ratio of the N-containing group to the O-containing group to the S-containing group in the hyperbranched polymer containing chelating atoms of N, O, and S is controlled to 5:3:2-5:1:1; specifically, mixing the hyperbranched polyamine with the hyperbranched polythiourea evenly at low temperature of 0° C., then adding the hyperbranched polycarboxylic acid, wherein a mass ratio of the hyperbranched polyamine to the hyperbranched polythiourea to the hyperbranched polycarboxylic acid is 1:1:2-5:1:10, performing a reaction according to a temperature program of 2-hour duration at 60° C. and 2-hour duration at 100° C., cooling naturally after the reaction and obtaining the hyperbranched polymer containing chelating atoms of N, O, and S;

step 2, subjecting a biomass raw material to an alkali treatment with an alkali solution, then mixing the biomass raw material with the hyperbranched polymer containing chelating atoms of N, O, and S obtained in step 1 evenly, performing a microwave treatment to strengthen the permeability of the hyperbranched polymer to the biomass raw material, adding a cross-linking agent epichlorohydrin under stirring, wherein a mass ratio of the biomass material to the hyperbranched polymer to epichlorohydrin is 1:1:1-1:50:100, allowing the reaction system to completely transform into solid particles to obtain the biomass-based hyperbranched adsorption material with multi-adsorption sites to multiple heavy metal ions, wherein a molar ratio of the N-containing group to the O-containing group to the S-containing group in the material is 5:3:2-5:1:1, and a total density of the N-containing group, the O-containing group and the S-containing group is higher than 12 mmol/g.

Preferably, preparation of the hyperbranched polycarboxylic acid is as follows: mixing trimethylolpropane, citric acid and p-toluenesulfonic acid evenly and reacting at 135° C. under stirring for 1.5 hours to obtain the hyperbranched polycarboxylic acid; a molar ratio of trimethylolpropane to citric acid is 1:4, an addition mass of p-toluenesulfonic acid accounts for 1.5 wt % of a total mass of trimethylolpropane and citric acid.

Preferably, preparation of the hyperbranched polyamine is as follows: mixing tetraethylene pentamine and methyl acrylate according to a molar ratio of 2:1, and reacting at 0° C. under stirring for 20 hours; raising the temperature of the reaction system to 70° C. and reacting under stirring for 2 hours; raising the temperature of the reaction system to 100° C. and reacting under stirring for 2 hours; raising the temperature of the reaction system to 140° C. and reacting under stirring for 2 hours; a product after reaction is the hyperbranched polyamine.

Preferably, preparation of the hyperbranched polythiourea is as follows: mixing diallylamine, epichlorohydrin and water according to a mole-mole-volume ratio of diallylamine to epichlorohydrin to water being 0.25 mol:0.27 mol:25 mL, then stirring at 0° C. for 5 hours, extracting a reaction mixture with ethyl acetate, then drying with anhydrous magnesium sulfate, followed by removing the solvent and the residual epichlorohydrin under vacuum to obtain a colorless solution, dissolving the colorless solution in methyl alcohol, adding potassium thiocyanate according to a molar ratio of diallylamine to potassium thiocyanate being 5:6, reacting for 9 hours, after cooling the reaction liquid to room temperature, removing the salts, concentrating, then diluting with ethyl acetate, and washing with water, drying an organic phase with anhydrous magnesium sulfate, concentrating, and obtaining 1-(2-hydroxy-3-diallylamino)propylisothiocyanate by reduced pressure distillation; mixing tri(2-aminoethyl)amine and 1-(2-hydroxy-3-diallylamino)propylisothiocyanate according to a mass ratio of 1.15:5.65 followed by stirring at 0° C. for 15 minutes, then stirring at 60° C. for 8 hours and above, removing the residual 1-(2-hydroxy-3-diallylamino)propylisothiocyanate by subjecting the reaction liquid to reduced pressure distillation, thus obtaining a colorless oily liquid denote as A-G1; mixing A-G1, cysteamine hydrochloride and benzoin dimethyl ether according to a mass ratio of 0.5:4.4:0.2, and adding methanol, after bubbling the solution with argon for 15 minutes, subjecting the solution to 365 nm UV-irradiation at room temperature for 2 hours, then adding triethylamine, wherein a mass-volume-volume ratio of A-G1 to methanol to triethylamine being 0.5 g:5 mL:10 mL, stirring for 30 minutes, removing methanol and the residual triethylamine by rotary evaporation, adding deionized water, then washing with diethyl ether, subjecting to aqueous solution dialysis, then freeze-drying, and obtaining a faint yellow product, hyperbranched polythiourea.

Preferably, the alkali solution in step 2 is an aqueous solution of sodium hydroxide with a mass fraction of 5 wt %; a mass-volume ratio of the biomass raw material to the alkali solution is 1 g:20 mL.

Preferably, power of the microwave treatment in step 2 is 1 W-1000 W, a catalytic duration of the microwave treatment is 1 minute-120 minutes.

The material of the present invention can be used to adsorb multiple heavy metal ions in water body. The material has excellent adsorption performance to multiple heavy metal ions in the water body which can simultaneously, rapidly and completely remove multiple heavy metal ions ($Cr^{6+}$, $Cu^{2+}$, $Pb^{2+}$) of low concentration within 10 minutes, and no heavy metal ions remain in the water body treated. Regeneration performance of the material is stable which still has a regeneration rate of 96% or more after 50 times of regeneration.

Compared with the prior art, the present invention has the following beneficial effects.

1. By one-step instant-crosslinking method, it is controllable to introduce the required functional group density to the material (i.e. the functional group density is controllable), and a high functional group density can thus be achieved by controlling an introduction ratio and an introduction amount of hyperbranched polyamine, hyperbranched polycarboxylic acid and hyperbranched polythiourea. A molar ratio of the N-containing group to the O-containing group to the S-containing group in the material is controlled at 5:3:2-5:1:1, and a total density of the N-containing group, the O-containing group and the S-containing group is higher than 12 mmol/g. High functional group density is the guarantee of high removal rate of heavy metal ions. Therefore, the material prepared by the present invention can remove the multi heavy metal ions ($Cr^{6+}$, $Cu^{2+}$, $Pb^{2+}$) by a removal rate of 100%, and there is no residual heavy metal ion in the treated water. Because the surface of the material has many functional groups (including N-containing group, O-containing group and S-containing group), removal of the heavy metal ions (having positive and negative charges such as $Cr^{6+}$, $Cu^{2+}$, $Pb^{2+}$) from water can be achieved by the material synchronously.

2. The biomass-based hyperbranched adsorption material with multi-adsorption sites to multiple heavy metal ions prepared by the present invention has a hyperbranched structure which is conducive to intramolecular and intermolecular mass-transfer of heavy metal ions by diffusion, thereby promoting an adsorption velocity of the material to multiple heavy metal ions. Multiple heavy metal ions ($Cr^{6+}$, $Cu^{2+}$, $Pb^{2+}$) of low concentration can be removed simultaneously, rapidly and completely within 10 minutes, and no heavy metal ions remain in the treated water.

3. The principle of the one-step instant-crosslinking method developed by the present invention is to crosslink the hydroxyl group of biomass raw material and the amino group of functional reagent, which is universal and can be applied to multi biomass matrix, such as microcrystalline cellulose, nano cellulose, pulp fiber, bagasse, straw, peanut hull or corn cob. By controlling an addition amount of the crosslinking agent, the reaction system is completely transformed into solid adsorption materials. The method improves the conversion rate of reaction reagents (100%), and can effectively regulate the proportion of functional groups, so as to regulate the adsorption performance of materials to multi heavy metal ions.

4. By using biomass cellulose material as matrix, the preparation progress of the present invention is achieved through the one-step instant-crosslinking method. Compared with the conventional cellulose-based adsorption material to heavy metal ions, the prepared biomass-based hyperbranched adsorption material with multi-adsorption sites to multiple heavy metal ions has characteristics of high surface functional group density and abundant varieties. In the aspect of performance, compared with the conventional cellulose-based adsorption material to heavy metal ions, the biomass-based hyperbranched adsorption material with multi-adsorption sites to multiple heavy metal ions of the present invention has advantages of high removal rate, large adsorption capacity, fast adsorption velocity, good regeneration performance, capability of adsorbing many kinds of heavy metal ions, simple recovery and easy desorption.

5. The biomass-based hyperbranched adsorption material with multi-adsorption sites to multiple heavy metal ions prepared by the present invention contains multiple adsorption sites of N, O, and S which have strong adsorption capacity to $Cr^{6+}$, $Cu^{2+}$, $Pb^{2+}$. Besides, a total density of N, O, and S functional groups is higher than 12 mmol/g, so the material can remove multiple heavy metal ions simultaneously with a removal rate of 100%.

6. The present invention takes biomass cellulose as the matrix, which is renewable and biodegradable.

7. The material prepared by the present invention has an adsorption capacity up to 360 mg/g or more for heavy metal ions in water, and the removal rate can reach 100%.

8. Because the hyperbranched polymer is fixed on the surface of the fiber by cross-linking agent through chemical bond, the regeneration stability of the material is good, and the regeneration rate can still reach 96% or more after 50 times of regeneration.

DESCRIPTION OF THE EMBODIMENTS

The present invention is further described below in combination with examples, but it cannot be understood as a limitation to the present invention. Without departing from the spirit and essence of the present invention, simple replacement of the methods, steps or conditions of the present invention belongs to the scope of the present invention. Unless otherwise specified, the technical means used in the examples are conventional means well known to those in the art.

Unless otherwise specified, the raw materials, reagents, methods and equipment used in the present invention are conventional reagents, methods and equipment in the technical field. Unless otherwise specified, the reagents and materials used in the following examples are commercially available.

Hyperbranched polycarboxylic acid, hyperbranched polyamine and hyperbranched polythiourea used in the following examples were prepared by the following preparation methods.

Specific preparation of hyperbranched polycarboxylic acid is as follows: trimethylolpropane, citric acid and p-toluenesulfonic acid were mixed evenly and subjected to a reaction at 135° C. under stirring for 1.5 hours to obtain the hyperbranched polycarboxylic acid; a molar ratio of trimethylolpropane to citric acid was 1:4, an addition mass of p-toluenesulfonic acid accounted for 1.5 wt % of a total mass of trimethylolpropane and citric acid.

Specific preparation of hyperbranched polyamine is as follows: tetraethylene pentamine and methyl acrylate were mixed according to a molar ratio of 2:1, and subjected to a reaction at 0° C. under stirring for 20 hours; temperature of the reaction system was raised to 70° C. and the reaction under stirring lasted for 2 hours; the temperature of the reaction system was raised to 100° C. and the reaction under stirring lasted for 2 hours; the temperature of the reaction system was raised to 140° C. and the reaction under stirring lasted for 2 hours; a product after reaction was the hyperbranched polyamine.

Specific preparation of hyperbranched polythiourea is as follows: diallylamine, epichlorohydrin and water were mixed according to a mole-mole-volume ratio of diallylamine to epichlorohydrin to water being 0.25 mol:0.27 mol:25 mL, then stirred at 0° C. for 5 hours, a reaction mixture was extracted with ethyl acetate, then dried with anhydrous magnesium sulfate, followed by removing the solvent and the residual epichlorohydrin under vacuum to obtain a colorless solution, the colorless solution was dissolved in methyl alcohol, potassium thiocyanate was added according to a molar ratio of diallylamine to potassium thiocyanate being 5:6, and subjected to a reaction for 9 hours, after cooling the reaction liquid to room temperature, the salts are removed, and the reaction liquid was concentrated, diluted with ethyl acetate, and washed with water, an organic phase was dried with anhydrous magnesium sulfate, concentrated, and subjected to reduced pressure distillation to obtain 1-(2-hydroxy-3-diallylamino)propylisothiocyanate; tri(2-aminoethyl)amine and 1-(2-hydroxy-3-diallylamino)propylisothiocyanate were mixed according to a mass ratio of 1.15:5.65, stirred at 0° C. for 15 minutes, and then stirred at 60° C. for 8 hours and above, the residual 1-(2-hydroxy-3-diallylamino)propylisothiocyanate was removed by subjecting the reaction liquid to reduced pressure distillation, thus obtaining a colorless oily liquid denote as A-G1; A-G1, cysteamine hydrochloride and benzoin dimethyl ether were mixed according to a mass ratio of 0.5:4.4:0.2, and methanol was added, after bubbling the solution with argon for 15 minutes, the solution was subjected to 365 nm UV-irradiation at room temperature for 2 hours, then triethylamine was added, wherein a mass-volume-volume ratio of A-G1 to methanol to triethylamine is 0.5 g:5 mL:10 mL, followed by stirring for 30 minutes, methanol and the residual triethylamine were removed by rotary evaporation, deionized water was added, then the solution was washed with diethyl ether, subjected to aqueous solution dialysis, and then freeze-dried to obtain a faint yellow product, hyperbranched polythiourea.

Example 1: Preparation of Biomass-Based Hyperbranched Adsorption Material with Multi-Adsorption Sites to Multiple Heavy Metal Ions Step 1: the hyperbranched polyamine was mixed with the hyperbranched polythiourea evenly at low temperature of 0° C., then the hyperbranched polycarboxylic acid was added, wherein a mass ratio of the hyperbranched polyamine to the hyperbranched polythiourea to the hyperbranched polycarboxylic acid is 1:1:2, a reaction was performed according to a temperature program of 2-hour duration at 60° C. and 2-hour duration at 100° C. A reaction product was cooled naturally after the reaction and the hyperbranched polymer containing chelating atoms of N, O, and S was obtained. In the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S. A molar ratio of the N-containing group to the O-containing group to the S-containing group in the hyperbranched polymer containing chelating atoms of N, O, and S is 5:1:1.

Step 2: 1 g microcrystalline cellulose was subjected to an alkali treatment with 20 mL 5 wt % sodium hydroxide aqueous solution, and then mixed with the hyperbranched polymer containing chelating atoms of N, O, and S obtained in step 1 evenly, a microwave treatment was performed to strengthen the permeability of the hyperbranched polymer to the biomass raw material with a microwave power of 1 W, a microwave catalysis duration was 120 minutes, a cross-linking agent epichlorohydrin was added under stirring, wherein a mass ratio of the microcrystalline cellulose to the hyperbranched polymer containing chelating atoms of N, O, and S to epichlorohydrin was 1:1:1, the reaction system was allowed to completely transform into solid particles to obtain the biomass-based hyperbranched adsorption material with multi-adsorption sites to multiple heavy metal ions. A molar ratio of the N-containing group to the O-containing group to the S-containing group in the material was 5:1:1, and a total density of the N-containing group, the O-containing group and the S-containing group was higher than 12 mmol/g.

Example 2: Preparation of Biomass-Based Hyperbranched Adsorption Material with Multi-Adsorption Sites to Multiple Heavy Metal Ions Step 1: the hyperbranched polyamine was mixed with the hyperbranched polythiourea evenly at low temperature of 0° C., then the hyperbranched polycarboxylic acid was added, wherein a mass ratio of the hyperbranched polyamine to the hyperbranched polythiourea to the hyperbranched polycarboxylic acid is 5:1:10, a reaction was performed according to a temperature program of 2-hour duration at 60° C. and 2-hour duration at 100° C. A reaction product was cooled naturally after the reaction and the hyperbranched polymer containing chelating atoms of N, O, and S was obtained. In the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S. A molar ratio of the N-containing group to the O-containing group to the S-containing group in the hyperbranched polymer containing chelating atoms of N, O, and S is 5:3:2.

Step 2: 1 g bagasse was subjected to an alkali treatment with 20 mL 5 wt % sodium hydroxide aqueous solution, and then mixed with the hyperbranched polymer containing chelating atoms of N, O, and S obtained in step 1 evenly, a microwave treatment was performed to strengthen the permeability of the hyperbranched polymer to the biomass raw material with a microwave power of 1000 W, a microwave catalysis duration was 1 minute, a cross-linking agent epichlorohydrin was added under stirring, wherein a mass ratio of the bagasse to the hyperbranched polymer containing chelating atoms of N, O, and S to epichlorohydrin was 1:50:100, the reaction system was allowed to completely transform into solid particles to obtain the biomass-based hyperbranched adsorption material with multi-adsorption sites to multiple heavy metal ions. A molar ratio of the N-containing group to the O-containing group to the S-containing group in the material was 5:3:2, and a total density of the N-containing group, the O-containing group and the S-containing group was higher than 12 mmol/g.

Example 3: Preparation of Biomass-Based Hyperbranched Adsorption Material with Multi-Adsorption Sites to Multiple Heavy Metal Ions Step 1: the hyperbranched polyamine was mixed with the hyperbranched polythiourea evenly at low temperature of 0° C., then the hyperbranched polycarboxylic acid was added, wherein a mass ratio of the hyperbranched polyamine to the hyperbranched polythiourea to the hyperbranched polycarboxylic acid is 2:1:4; a reaction was performed according to a temperature program of 2-hour duration at 60° C. and 2-hour duration at 100° C. A reaction product was cooled naturally after the reaction and the hyperbranched polymer containing chelating atoms of N, O, and S was obtained. In the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S. A molar ratio of the N-containing group to the O-containing group to the S-containing group in the hyperbranched polymer containing chelating atoms of N, O, and S is 5:2:2.

Step 2: 1 g corn cob was subjected to an alkali treatment with 20 mL 5 wt % sodium hydroxide aqueous solution, and then mixed with the hyperbranched polymer containing chelating atoms of N, O, and S obtained in step 1 evenly, a microwave treatment was performed to strengthen the permeability of the hyperbranched polymer to the biomass raw material with a microwave power of 500 W, a microwave catalysis duration was 60 minutes, a cross-linking agent epichlorohydrin was added under stirring, wherein a mass ratio of the corn cob to the hyperbranched polymer containing chelating atoms of N, O, and S to epichlorohydrin was 1:25:50, the reaction system was allowed to completely transform into solid particles to obtain the biomass-based hyperbranched adsorption material with multi-adsorption sites to multiple heavy metal ions. A molar ratio of the N-containing group to the O-containing group to the S-containing group in the material was 5:2:2, and a total density of the N-containing group, the O-containing group and the S-containing group was higher than 12 mmol/g.

Example 4: Preparation of Biomass-Based Hyperbranched Adsorption Material with Multi-Adsorption Sites to Multiple Heavy Metal Ions Step 1: the hyperbranched polyamine was mixed with the hyperbranched polythiourea evenly at low temperature of 0° C., then the hyperbranched polycarboxylic acid was added, wherein a mass ratio of the hyperbranched polyamine to the hyperbranched polythiourea to the hyperbranched polycarboxylic acid is 5:1:10, a reaction was performed according to a temperature program of 2-hour duration at 60° C. and 2-hour duration at 100° C. A reaction product was cooled naturally after the reaction and the hyperbranched polymer containing chelating atoms of N, O, and S was obtained. In the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S. A molar ratio of the N-containing group to the O-containing group to the S-containing group in the hyperbranched polymer containing chelating atoms of N, O, and S is 5:3:2.

Step 2: 1 g nano cellulose was subjected to an alkali treatment with 20 mL 5 wt % sodium hydroxide aqueous solution, and then mixed with the hyperbranched polymer containing chelating atoms of N, O, and S obtained in step 1 evenly, a microwave treatment was performed to strengthen the permeability of the hyperbranched polymer to the biomass raw material with a microwave power of 750 W, a microwave catalysis duration was 90 minutes, a cross-linking agent epichlorohydrin was added under stirring, wherein a mass ratio of the bagasse to the hyperbranched polymer containing chelating atoms of N, O, and S to epichlorohydrin was 1:10:10, the reaction system was allowed to completely transform into solid particles to obtain the biomass-based hyperbranched adsorption material with multi-adsorption sites to multiple heavy metal ions. A molar ratio of the N-containing group to the O-containing group to the S-containing group in the material was 5:3:2, and a total density of the N-containing group, the O-containing group and the S-containing group was higher than 12 mmol/g.

Example 5: Preparation of Biomass-Based Hyperbranched Adsorption Material with Multi-Adsorption Sites to Multiple Heavy Metal Ions Step 1: the hyperbranched polyamine was mixed with the hyperbranched polythiourea evenly at low temperature of 0° C., then the hyperbranched polycarboxylic acid was added, wherein a mass ratio of the hyperbranched polyamine to the hyperbranched polythiourea to the hyperbranched polycarboxylic acid is 2:1:4, a reaction was performed according to a temperature program of 2-hour duration at 60° C. and 2-hour duration at 100° C. A reaction product was cooled naturally after the reaction and the hyperbranched polymer containing chelating atoms of N, O, and S was obtained. In the hyperbranched polymer containing chelating atoms of N, O, and S, the N-containing group is selected from a group consisting of primary amino group, secondary amino group and tertiary amino group, the O-containing group is carboxyl group, the S-containing group is selected from a group consisting of C—S and C=S. A molar ratio of the N-containing group to the O-containing group to the S-containing group in the hyperbranched polymer containing chelating atoms of N, O, and S is 5:2:2.

Step 2: 1 g peanut hull was subjected to an alkali treatment with 20 mL 5 wt % sodium hydroxide aqueous solution, and then mixed with the hyperbranched polymer containing chelating atoms of N, O, and S obtained in step 1 evenly, a microwave treatment was performed to strengthen the permeability of the hyperbranched polymer to the biomass raw material with a microwave power of 250 W, a microwave catalysis duration was 90 minutes, a cross-linking agent epichlorohydrin was added under stirring, wherein a mass ratio of the peanut hull to the hyperbranched polymer containing chelating atoms of N, O, and S to epichlorohydrin was 1:30:80, the reaction system was allowed to completely transform into solid particles to obtain the biomass-based hyperbranched adsorption material with multi-adsorption sites to multiple heavy metal ions. A molar ratio of the N-containing group to the O-containing group to the S-containing group in the material was 5:2:2, and a total density of the N-containing group, the O-containing group and the S-containing group was higher than 12 mmol/g.

Comparative Example 1

The difference from Example 1 is that hyperbranched polyamine was not added in step 1 of Comparative Example 1, which was replaced by the same mass of hyperbranched polythiourea, and other steps and process conditions were the same as that of Example 1.

Comparative Example 2

The difference from Example 2 is that step 2 was not carried out in Comparative Example 2, and other steps and process conditions were the same as that of Example 2.

Comparative Example 3

The difference from Example 3 is that hyperbranched polythiourea was not added in step 1 of Comparative Example 3, which was replaced by the same mass of hyperbranched polyamine, and other steps and process conditions were the same as that of Example 3.

Performance Test:

The materials obtained in Examples 1-5 and Comparative Examples 1-3 were subjected to a test of adsorption capacity and removal rate to heavy metal ions. Results are shown as Table 1.

Table 1 Results of adsorption capacity and removal rate of the materials to heavy metal ions Item 1: Adsorption capacity to $Cr^{6+}$ aqueous solution with an initial concentration of 100 mg/L (mg/g)

Item 2: Removal rate to $Cr^{6+}$ aqueous solution with an initial concentration of 100 mg/L (%)

Item 3: Adsorption capacity to $Cu^{2+}$ aqueous solution with an initial concentration of 100 mg/L (mg/g)

Item 4: Removal rate to $Cu^{2+}$ aqueous solution with an initial concentration of 100 mg/L (%)

Item 5: Adsorption capacity to $Pb^{2+}$ aqueous solution with an initial concentration of 100 mg/L (mg/g)

Item 6: Removal rate to $Pb^{2+}$ aqueous solution with an initial concentration of 100 mg/L (%)

Item 7: Adsorption capacity to $Cr^{6+}$ aqueous solution with an initial concentration of 1 mg/L (mg/g)

Item 8: Removal rate to $Cr^{6+}$ aqueous solution with an initial concentration of 1 mg/L (%)

Item 9: Adsorption capacity to $Cu^{2+}$ aqueous solution with an initial concentration of 1 mg/L (mg/g)

Item 10: Removal rate to $Cu^{2+}$ aqueous solution with an initial concentration of 1 mg/L (%)

Item 11: Adsorption capacity to $Pb^{2+}$ aqueous solution with an initial concentration of 1 mg/L (mg/g)

Item 12: Removal rate to $Pb^{2+}$ aqueous solution with an initial concentration of 1 mg/L (%)

| Item | 1 | 2 | 3 | 4 | 5 | 6 |
|---|---|---|---|---|---|---|
| Example 1 | 375.87 | 100 | 380.45 | 100 | 376.32 | 100 |
| Example 2 | 379.23 | 100 | 375.56 | 100 | 369.23 | 100 |
| Example 3 | 389.53 | 100 | 396.35 | 100 | 375.36 | 100 |
| Example 4 | 370.45 | 100 | 397.36 | 100 | 398.36 | 100 |
| Example 5 | 365.57 | 100 | 392.36 | 100 | 362.31 | 100 |
| Comparative Example 1 | 256.56 | 70.3 | 392.36 | 100 | 362.31 | 100 |
| Comparative Example 2 | 378.59 | 100 | 369.32 | 100 | 363.32 | 100 |
| Comparative Example 3 | 370.45 | 100 | 102.36 | 40.3 | 123.65 | 36.5 |

| Item | 7 | 8 | 9 | 10 | 11 | 12 |
|---|---|---|---|---|---|---|
| Example 1 | 1.15 | 100 | 1.26 | 100 | 1.18 | 100 |
| Example 2 | 1.15 | 100 | 1.26 | 100 | 1.18 | 100 |
| Example 3 | 1.15 | 100 | 1.26 | 100 | 1.18 | 100 |
| Example 4 | 1.15 | 100 | 1.26 | 100 | 1.18 | 100 |
| Example 5 | 1.15 | 100 | 1.26 | 100 | 1.18 | 100 |
| Comparative Example 1 | 0.101 | 10 | 1.26 | 100 | 1.18 | 100 |
| Comparative Example 2 | 1.15 | 100 | 1.26 | 100 | 1.18 | 100 |
| Comparative Example 3 | 1.15 | 100 | 0.398 | 39.6 | 0.379 | 36.5 |

It can be seen from the test results of Table 1 that the biomass-based hyperbranched adsorption material with multi-adsorption sites to multiple heavy metal ions of the present invention has a relatively high density of amino groups, carboxyl groups, C—S and C=S, which are functional groups that have adsorption ability to heavy metal ions. Additionally, the material has a hyperbranched structure, and thus significant improvement in adsorption capacity of the material to heavy metal ions is resulted, and so does the utilization rate of functional groups in the material. Simultaneously, removal rate of the material to heavy metal ions with negative charges and positive charges is significantly enhanced. Adsorption capacities of the materials to heavy metal ions ($Cr^{6+}$, $Cu^{2+}$, $Pb^{2+}$) are all above 360 mg/g, with an adsorption rate of 100%.

Since hyperbranched polyamine was not added in the process of preparing the material in Comparative Example 1, the adsorption capacity and removal rate of the material to $Cr^{6+}$ were lower. Since hyperbranched polythiourea was not added in the process of preparing the material in Comparative Example 3, the adsorption capacities and removal rates of the material to $Cu^{2+}$ and $Pb^{2+}$ were lower.

TABLE 2

Test results of adsorption velocity of the materials to heavy metal ions

| Item | Required time for $Cr^{6+}$ aqueous solution with an initial concentration of 100 mg/L reaching balance (min) | Required time for $Cu^{2+}$ aqueous solution with an initial concentration of 100 mg/L reaching balance (min) | Required time for $Pb^{2+}$ aqueous solution with an initial concentration of 100 mg/L reaching balance (min) |
|---|---|---|---|
| Example 1 | 8 | 8 | 9 |
| Example 2 | 8 | 9 | 9 |
| Example 3 | 6 | 9 | 9 |
| Example 4 | 8 | 9 | 9 |
| Example 5 | 8 | 8 | 8 |
| Comparative Example 1 | 15 | 36 | 35 |
| Comparative Example 2 | 60 | 180 | 160 |
| Comparative Example 3 | 16 | 160 | 150 |

It can be seen from the test results of Table 2 that the biomass-based hyperbranched adsorption material with multi-adsorption sites to multiple heavy metal ions of the present invention has a hyperbranched structure and multi-adsorption sites which can effectively enhance the adsorption velocity of the material to multiple heavy metal ions.

Since the biomass raw material bagasse was not added in the preparation process of Comparative Example 2, adsorption velocity of the material to heavy metal ions was greatly decreased.

TABLE 3

Test results of regeneration performance of the materials

| Item | Regeneration rate after 10 times of regeneration (%) | Regeneration rate after 20 times of regeneration (%) | Regeneration rate after 50 times of regeneration (%) |
|---|---|---|---|
| Example 1 | 99.26 | 98.14 | 96.32 |
| Example 2 | 99.36 | 98.26 | 96.45 |
| Example 3 | 99.15 | 98.36 | 96.12 |
| Example 4 | 99.24 | 97.95 | 96.23 |
| Example 5 | 99.43 | 97.36 | 96.51 |
| Comparative Example 1 | 98.36 | 95.21 | 93.32 |
| Comparative Example 2 | 98.12 | 96.56 | 95.23 |
| Comparative Example 3 | 96.31 | 92.35 | 89.35 |

It can be seen from the test results of Table 3 that in the biomass-based hyperbranched adsorption material with multi-adsorption sites to multiple heavy metal ions of the present invention, since the hyperbranched polymer is connected with the biomass raw material by chemical bonds, and at the same time a hyperbranched polymer with low electric potential energy is introduced to the surface, in the same regeneration conditions, the biomass-based hyperbranched adsorption material with multi-adsorption sites to multiple heavy metal ions has a regeneration rate of 96% or more after 50 times of regeneration, with better regeneration performance.

What is claimed is:

1. A preparation method for a biomass-based hyperbranched adsorption material with multi-adsorption sites to multiple heavy metal ions, comprising the following steps:

step 1, preparing a hyperbranched polymer containing chelating atoms of N, O, and S through an amidation reaction of hyperbranched polyamine, hyperbranched polycarboxylic acid and hyperbranched polythiourea, wherein in the hyperbranched polymer containing chelating atoms of N, O, and S, an N-containing group is selected from a group consisting of primary amino group, secondary amino group and tertiary amino group, an O-containing group is carboxyl group, a S-containing group is selected from a group consisting of C—S and C=S; the specific reaction is as follows: the carboxyl group of the hyperbranched polycarboxylic acid reacts with the primary amino groups of the hyperbranched polyamine and of the hyperbranched polythiourea to generate the hyperbranched polymer containing chelating atoms of N, O, and S in which the hyperbranched polycarboxylic acid is connected with the hyperbranched polyamine and the hyperbranched polythiourea by chemical bonds, a molar ratio of the N-containing group to the O-containing group to the S-containing group in the hyperbranched polymer containing chelating atoms of N, O, and S is controlled to 5:3:2-5:1:1; the amidation reaction includes mixing the hyperbranched polyamine with the hyperbranched polythiourea evenly at low temperature of 0° C., then adding the hyperbranched polycarboxylic acid, wherein a mass ratio of the hyperbranched polyamine to the hyperbranched polythiourea to the hyperbranched polycarboxylic acid is 1:1:2-5:1:10, performing a reaction according to a temperature program of 2-hour duration at 60° C. and 2-hour duration at 100° C., cooling naturally after the reaction and obtaining the hyperbranched polymer containing chelating atoms of N, O, and S; and step 2, subjecting a biomass raw material to an alkali treatment with an alkali solution, then mixing the biomass raw material with the hyperbranched polymer containing chelating atoms of N, O, and S obtained in the step 1 evenly, performing a microwave treatment to strengthen the permeability of the hyperbranched polymer to the biomass raw material, adding a cross-linking agent epichlorohydrin under stirring, wherein a mass ratio of the biomass material to the hyperbranched polymer containing chelating atoms of N, O, and S to epichlorohydrin is 1:1:1-1:50:100, allowing the reaction system to completely transform into solid particles to obtain the biomass-based hyperbranched adsorption material with multi-adsorption sites to multiple heavy metal ions, wherein a molar ratio of the N-containing group to the O-containing group to the S-containing group in the material is 5:3:2-5:1:1, and a total density of the N-containing group, the O-containing group and the S-containing group is higher than 12 mmol/g.

2. The preparation method according to claim 1, wherein preparation of the hyperbranched polycarboxylic acid is as follows: mixing trimethylolpropane, citric acid and p-toluenesulfonic acid evenly and reacting at 135° C. under stirring for 1.5 hours to obtain the hyperbranched polycarboxylic acid; a molar ratio of trimethylolpropane to citric acid is 1:4, an addition mass of p-toluenesulfonic acid accounts for 1.5 wt % of a total mass of trimethylolpropane and citric acid.

3. The preparation method according to claim 1, wherein preparation of the hyperbranched polyamine is as follows: mixing tetraethylene pentamine and methyl acrylate according to a molar ratio of 2:1, and reacting at 0° C. under stirring for 20 hours; raising the temperature of the reaction system to 70° C. and reacting under stirring for 2 hours; raising the temperature of the reaction system to 100° C. and reacting under stirring for 2 hours; raising the temperature of the reaction system to 140° C. and reacting under stirring for 2 hours; a product after reaction is the hyperbranched polyamine.

4. The preparation method according to claim 1, wherein preparation of the hyperbranched polythiourea is as follows: mixing diallylamine, epichlorohydrin and water according to a mole-mole-volume ratio of diallylamine to epichlorohydrin to water being 0.25 mol:0.27 mol : 25 mL, then stirring at 0° C. for 5 hours, extracting a reaction mixture with ethyl acetate, then drying with anhydrous magnesium sulfate, followed by removing the solvent and the residual epichlorohydrin under vacumn to obtain a colorless solution, dissolving the colorless solution in methyl alcohol, adding potassium thiocyanate according to a molar ratio of diallylamine to potassium thiocyanate being 5:6, reacting for 9 hours, after cooling the reaction liquid to room temperature, removing the salts, concentrating, then diluting with ethyl acetate, and washing with water, drying an organic phase with anhydrous magnesium sulfate, concentrating, and obtaining 1-(2-hydroxy-3-diallylamino)propylisothiocyanate by reduced pressure distillation; mixing tri(2-aminoethyl)amine and 1-(2-hydroxy-3-diallylamino)propylisothiocyanate according to a mass ratio of 1.15:5.65 followed by stirring at 0° C. for 15 minutes, then stirring at 60° C. for 8 hours and above, removing the residual 1-(2-hydroxy-3-diallylamino)propylisothiocyanate by subjecting the reaction liquid to reduced pressure distillation , thus obtaining a colorless oily liquid denote as A-G1; mixing A-G1, cysteamine hydrochloride and benzoin dimethyl ether according to a mass ratio of 0.5:4.4:0.2, and adding methanol, after bubbling the solution with argon for 15 minutes, subjecting the solution to 365 nm UV-irradiation at room temperature for 2 hours, then adding triethylamine, wherein a mass-volume-volume ratio of A-G1 to methanol to triethylamine being 0.5 g:5 ml:10 mL, stirring for 30 mintutes, removing methanol and the residual triethylamine by rotary evaporation, adding deionized water, then washing with diethyl ether, subjecting to aqueous solution dialysis, then freeze-drying, and obtaining a faint yellow product, hyperbranched polythiourea.

5. The preparation method according to claim 1, wherein the alkali solution in the step 2 is an aqueous solution of sodium hydroxide with a mass fraction of 5 wt %; a mass-volume ratio of the biomass raw material to the alkali solution is 1 g:20 mL.

6. The preparation method according to claim 1, wherein power of the microwave treatment in the step 2 is 1 W-1000 W, a catalytic duration of the microwave treatment is 1 minute-120 minutes.

7. The preparation method according to claim 1, wherein the biomass raw material is selected from a group consisting of microcrystalline cellulose, nano cellulose, pulp fiber, bagasse, straw, peanut hull and corn cob.

\* \* \* \* \*